(12) United States Patent
Lee et al.

(10) Patent No.: US 8,472,906 B1
(45) Date of Patent: *Jun. 25, 2013

(54) SYSTEMS AND METHODS FOR RECOVERY OF A SUB-CARRIER SIGNAL FROM A STEREOPHONIC MULTIPLEXED SIGNAL

(75) Inventors: Chris Cheng-Chieh Lee, San Jose, CA (US); Hui-Ling Lou, Sunnyvale, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,621

(22) Filed: Aug. 30, 2012

Related U.S. Application Data

(63) Continuation of application No. 12/696,558, filed on Jan. 29, 2010, now Pat. No. 8,260,238, which is a continuation of application No. 11/582,735, filed on Oct. 17, 2006, now Pat. No. 7,684,774.

(60) Provisional application No. 60/782,945, filed on Mar. 16, 2006.

(51) Int. Cl.
*H04B 7/00* (2006.01)

(52) U.S. Cl.
USPC .............. 455/230; 455/232.1; 455/235.1; 455/334; 455/338; 455/339; 330/52; 330/151

(58) Field of Classification Search
USPC ................. 455/230, 232.1, 235.1, 334, 338, 455/339; 330/52, 151
See application file for complete search history.

(56) References Cited

U.S. PATENT DOCUMENTS

| | | | |
|---|---|---|---|
| 5,732,068 A | | 3/1998 | Takahashi et al. |
| 5,796,304 A | | 8/1998 | Gentzler |
| 5,838,733 A | * | 11/1998 | Bruckert ........................ 375/297 |
| 6,166,601 A | * | 12/2000 | Shalom et al. ................ 330/151 |
| 6,388,515 B1 | * | 5/2002 | Nishida ........................... 330/52 |
| 7,123,086 B2 | | 10/2006 | Braithwaite |
| 7,684,774 B1 | | 3/2010 | Lee et al. |

* cited by examiner

*Primary Examiner* — Sanh Phu

(57) ABSTRACT

Disclosed herein are systems and methods for recovering a sub-carrier signal from a multiplexed signal having an embedded pilot tone signal. The recovery system includes circuitry for recovering a pilot signal from the received multiplexed signal, for generating a frequency-doubled signal from the recovered pilot signal, and for phase-shifting the frequency-doubled signal by a pre-determined phase difference from the embedded pilot tone signal. Another recovery system includes circuitry for recovering a pilot signal from the received multiplexed signal, for phase-shifting the pilot signal by a pre-determined phase difference from the embedded pilot tone signal, and for generating a frequency-doubled signal from the phase-shifted signal.

20 Claims, 15 Drawing Sheets

SYSTEMS AND METHODS FOR RECOVERY OF A SUB-CARRIER SIGNAL FROM A STEREOPHONIC MULTIPLEXED SIGNAL

CROSS-REFERENCE TO RELATED APPLICATIONS

This application is a continuation of co-pending U.S. patent application Ser. No. 12/696,558, filed Jan. 29, 2010, which is a continuation of U.S. patent application Ser. No. 11/582,735, filed Oct. 17, 2006 (now U.S. Pat. No. 7,684,774), which claims the benefit under 35 U.S.C. §119(e) of U.S. Provisional Application No. 60/782,945, filed Mar. 16, 2006 (now expired), which are hereby incorporated by reference herein in their entireties.

This application claims the benefit under 35 U.S.C. §119(e) of U.S. Provisional Application No. 60/782,945 filed Mar. 16, 2006, which is hereby incorporated by reference herein in its entirety.

BACKGROUND OF THE INVENTION

Stereo FM receivers are commonly used in many consumer products. In a conventional stereo FM receiver, an input analog signal is received, down-converted to an intermediate frequency (IF), and digitized before being demodulated to a stereophonic multiplexed (MPX) signal. The resulting MPX signal is composed of three components: (a) a summation signal of left (L) and right (R) channels $$\left(\frac{L+R}{2}\right)$$

at baseband, (b) a pilot tone signal at 19 kHz, and (c) a double-sideband suppressed-carrier (DSBSC) modulated difference signal $$\left(\frac{L-R}{2}\right)$$

at 38 kHz, twice the frequency of the pilot tone signal.

In an FM stereo receiver, the difference component $$\left(\frac{L-R}{2}\right)$$

is extracted from the MPX signal and down-converted to baseband before being added to and subtracted from the baseband summation component $$\left(\frac{L+R}{2}\right)$$

to produce distinct L and R signals for stereo output. Typically, minimal signal processing is required to extract the baseband summation component of the MPX signal. The 19 kHz pilot signal may be recovered by passing the MPX signal through a narrow band-pass filter centered at 19 kHz. This received pilot signal may then undergo frequency doubling to generate a 38 kHz sub-carrier signal. The difference component may be recovered by first passing the MPX signal through a band-pass filter centered at 38 kHz. The resulting signal may then be modulated with the 38 kHz sub-carrier to down-convert the difference component to baseband. The recovered $$\left(\frac{L-R}{2}\right)$$

difference component and $$\left(\frac{L+R}{2}\right)$$

summation component, both in baseband, may then be added and subtracted to generate separate L and R outputs.

In doubling the 19 kHz recovered pilot signal to produce a 38 KHz sub-carrier signal, a strict phase relation between the two signals must be enforced to maintain a separation between the left and right channels in an effort to minimize channel leakage. This is important because channel leakage may have a detrimental effect on the resulting audio qualities. Moreover, the non-ideal nature of the circuit components used in most signal-processing circuitry complicates this phase relation between the pilot tone and sub-carrier signals by injecting noise, such as phase delays, into the waveforms.

This invention relates to systems and methods for producing a 38 kHz sub-carrier signal from a 19 kHz pilot tone signal and for maintaining a phase relation between the two signals in an effort to minimize channel leakage.

SUMMARY OF THE INVENTION

The invention provides systems and methods for recovering a sub-carrier signal from a multiplexed signal having an embedded pilot tone signal and for enforcing a pre-determined phase difference between the sub-carrier and pilot tone signals.

According to one aspect of the invention, a receiver system is provided that includes circuitry for receiving an input MPX signal having an embedded pilot tone signal. A pilot signal may be recovered from the received MPX signal using, for example, a band-pass filter. A frequency-doubled signal may then be generated from the recovered pilot signal. The resulting frequency-doubled signal may subsequently be phase shifted by a pre-determined phase difference from the embedded pilot tone signal.

In one aspect, the recovered pilot signal may include a phase difference from the pilot tone signal.

In one aspect, the circuitry for generating the frequency-doubled signal from the recovered pilot signal may include circuitry for squaring the recovered pilot signal to generate an intermediate signal, circuitry for extracting a high-frequency component of the intermediate signal, circuitry for providing an amplitude scaling function, and circuitry for multiplying the amplitude scaling function with the high-frequency component to generate the frequency-doubled signal.

In one aspect, the circuitry for providing the amplitude scaling function includes circuitry for delaying the intermediate signal to generate a delayed signal, circuitry for subtracting the high-frequency component from the delayed signal to generate a modulating function, and circuitry for inverting the modulating function to generate the amplitude scaling function.

In one aspect, the circuitry for generating the frequency-doubled signal from the recovered pilot signal may include circuitry for providing an estimated derivative of the recovered pilot signal, circuitry for multiplying the recovered pilot signal with the estimated derivative to generate an intermediate signal, and circuitry for multiplying the intermediate signal with an amplitude-scaling function to generate the frequency-doubling signal.

In one aspect, the pre-determined phase difference between the embedded pilot tone signal and the phase-shifted signal is approximately a quadrature phase.

In one aspect, the pre-determined phase difference between the embedded pilot tone signal and the phase-shifted signal is approximately zero.

According to another aspect of the invention, a receiver system is provided for recovering a sub-carrier signal from a multiplexed signal having an embedded pilot tone signal. The system includes a receiver for receiving the multiplexed signal. A pilot signal may be recovered from the received multiplexed signal using circuitry such as a band-pass filter. The recovered pilot signal may then be phase-shifted by a pre-determined phase difference from the embedded pilot tone signal. This pre-determined phase difference may be approximately $$\frac{\pi}{4}.$$

The phase-shifted signal may then be used to generate a frequency-doubled signal from the phase-shifted signal.

In another aspect, circuitry used for generating the frequency-doubled signal from the phase-shifted signal includes circuitry for squaring the phase-shifted signal to generate an intermediate signal, circuitry for extracting a high-frequency component of the intermediate signal, circuitry for providing an amplitude scaling function, and circuitry for multiplying the amplitude scaling function with the high-frequency component to generate the frequency-doubled signal.

In another aspect, circuitry used for providing the amplitude scaling function includes circuitry for delaying the intermediate signal to generate a delayed signal, circuitry for subtracting the high-frequency component from the delayed signal to generate a modulating function, and circuitry for inverting the modulating function to generate the amplitude scaling function.

Further features of the invention, its nature and various advantages, will be more apparent from the accompanying drawings and the following detailed description of the preferred embodiments.

DETAILED DESCRIPTION OF THE INVENTION

The invention provides systems and methods for recovering a 38 kHz sub-carrier signal from a 19 kHz pilot tone signal and for enforcing a pre-determined phase relation between those signals. For ease of explanation and without limiting the scope of the invention, it will be assumed that the sub-carrier and pilot signals are both expressed as sinusoidal functions.

Figure 1:
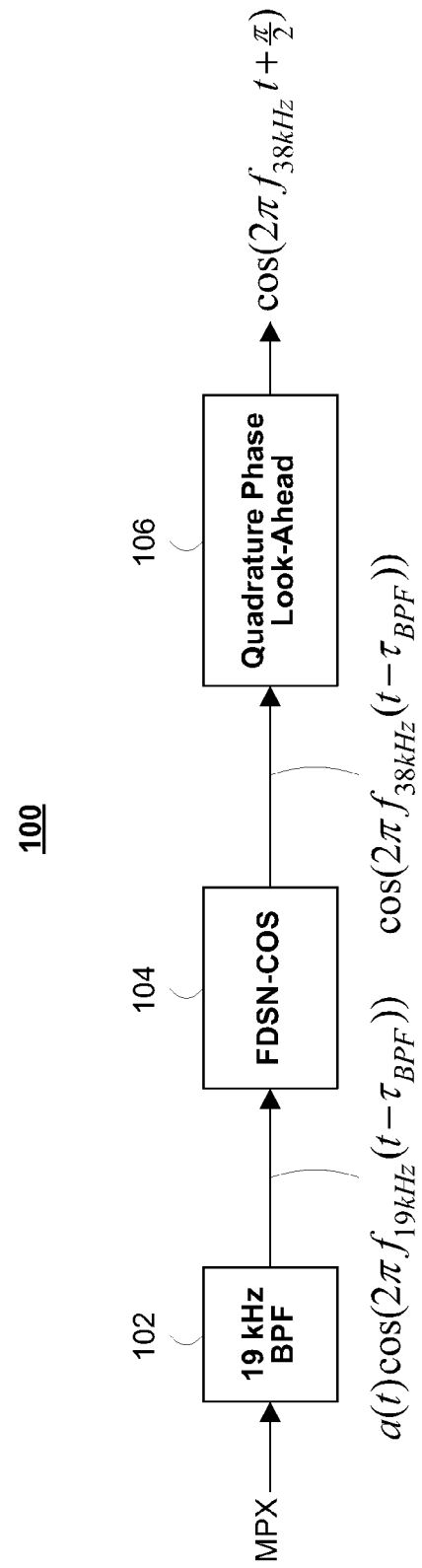
FIG. 1 is an illustrative block diagram of an exemplary 38 kHz sub-carrier signal recovery system in accordance with an aspect of the invention.

FIG. 1 illustrates a high-level block diagram 100 of an exemplary 38 kHz sub-carrier signal recovery scheme according to one aspect of the invention. In this implementation, the pilot and sub-carrier signals are represented as cosine functions. The circuitry includes a 19 kHz band-pass filter 102 for recovering the pilot tone signal, a Frequency Doubling Scale Normalization (FDSN-COS) functional block 104 for generating a 38 kHz sub-carrier signal from the recovered pilot signal, and a phase look-ahead functional block 106 for imposing a pre-determined phase difference between the pilot and sub-carrier signals.

The received MPX signal may be expressed as a composite of the following cosine functions:

$$MPX = 0.9 * M' + 0.9 * S' * \cos\left(2\pi f_{38kHz}t + \frac{\pi}{2}\right) + \quad \text{Equation (1)}$$
$$(0.09 \pm 0.01) * \cos(2\pi f_{19kHz}t),$$

where the first term of Equation (1) corresponds to a baseband summation component signal, the second term corresponds to an amplitude-modulated difference component signal at 38 kHz, and the third term corresponds to a reference pilot tone signal at 19 kHz. In particular, the M' signal of Equation (1) represents a pre-emphasis filtered version of the summation component $$\left(\frac{L+R}{2}\right),$$

and the S' signal represents a pre-emphasis filtered version of the difference component $$\left(\frac{L-R}{2}\right).$$

In general, pre-emphasis filtering (not shown) reduces high-frequency noise associated with signal transmissions. It should be understood that any suitable signal processing may be performed with the received MPX signal to prepare the signal for demodulation. However, in some embodiments, no additional processing is required.

In an effort to maintain a separation between the L and R signals for minimizing potential occurrences of channel leakage, a $$\frac{\pi}{2}$$

or quadrature phase difference may be introduced between the cosine sub-carrier signal of the second term in Equation (1) and the recovered cosine pilot signal of the third term. It can be shown that introducing this quadrature phase separation may ensure the condition that, when L is a positive value and R=−L, whenever the MPX signal crosses the time axis the MPX signal has a positive slope correlating to the occurrence of pilot tone signal having an instantaneous value of zero. This requirement, herein referred to as a "positive-slope requirement," may be maintained by introducing a quadrature phase difference between the pilot and sub-carrier components of the MPX signal of Equation (1). However, the phase condition required to maintain the positive-slope requirement varies depending on how a MPX signal is represented. For example, the quadrature phase offset derived for the cosine MPX signal in Equation (1) would not be the same in the case where the MPX signal is represented as a sine function. This concept will be explained below in greater detail.

A sharp band-pass filter 102 centered at 19 kHz may then be used to recover the 19 kHz pilot signal from the MPX signal. Ideally, the recovered pilot signal may be represented as $a(t)\cos(2\pi f_{19kHz}t)$, where $a(t)$ is a slow-varying amplitude scaling function, but due to the non-ideal nature of band-pass filter 102, an unwanted delay may be injected into the recovered pilot signal at the output of the filtering process. The pilot signal including this delay may be represented as $a(t)\cos(2\pi f_{19kHz}(t-\tau_{bpf}))$, where $\tau_{bpf}$ represents a non-ideal delay introduced by band-pass filter 102. $\tau_{bpf}$ may also represent other delays introduced by system 100 to the recovered pilot signal.

The recovered pilot signal may then be applied to FDSN-COS functional block 104, subsequently generating a normalized 38 kHz signal $\cos(2\pi f_{38kHz}(t-\tau_{bpf}))$. It is observed that filter delay $\tau_{bpf}$ is propagated from the recovered pilot signal to the output of FDSN-COS block 104. Hence phase look-ahead block 106 may then be used to apply a phase correction to the signal output to approximately cancel filter delay $\tau_{bpf}$ while introducing an overall quadrature phase offset to the normalized 38 kHz signal. FDSN-COS block 104 and quadrature phase look-ahead block 106 will be described below in further operational detail. The resulting signal produced from the arrangement of FIG. 1 is a 38 kHz sub-carrier signal $$\cos\left(2\pi f_{38kHz}t + \frac{\pi}{2}\right)$$

which satisfies the phase condition set forth by the positive-slope requirement described above.

Figure 2:
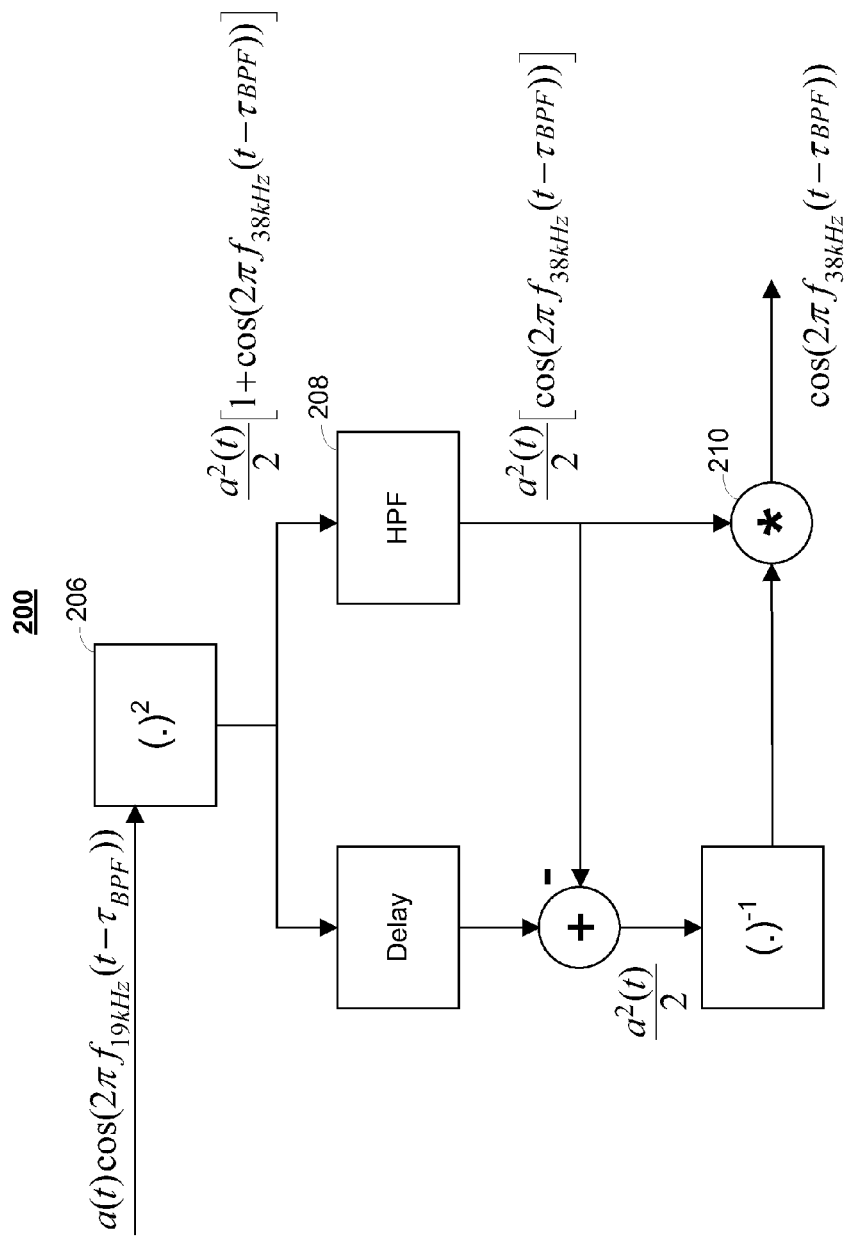
FIG. 2 is an illustrative block diagram of a Frequency-Doubling Cosine Signal Normalization (FDSN-COS) circuitry in accordance with an aspect of the invention.

An exemplary implementation of FDSN-COS functional block 104 is illustrated in FIG. 2. FDSN-COS block 200 operates by producing a normalized 38 kHz signal from an input 19 kHz recovered pilot signal. First a square operation 206 is applied to the input recovered pilot signal $a(t)\cos(2\pi f_{19kHz}(t-\tau_{bpf}))$ to produce a frequency-doubled signal $$\frac{a^2(t)}{2}[1 + \cos(2\pi f_{38kHz}(t - \tau_{bpf}))]$$

based on the trigonometric identity $$\cos^2\theta = \frac{1}{2}(1 + \cos 2\theta),$$

where here $\theta = 2\pi f_{19kHz}(t-\tau_{bpf})$. This signal may then be processed by a high-pass filter 208 to remove the baseband component $$\frac{a^2(t)}{2}$$

and is then multiplied by a normalizing function $$\frac{2}{a^2(t)}$$

at multiplier 210 to further produce a normalized signal $\cos(2\pi f_{38kHz}(t-\tau_{bpf}))$. This signal preferably has a 38 kHz sampling rate and is in phase with the recovered pilot signal. The scaling function may be determined by delaying the signal $$\frac{a^2(t)}{2}[1 + \cos(2\pi f_{38kHz}(t - \tau_{bpf}))]$$

to extract its slow-varying component $$\frac{a^2(t)}{2}$$

before inverting the component to generate the scaling function $$\frac{2}{a^2(t)}.$$

Figure 3:
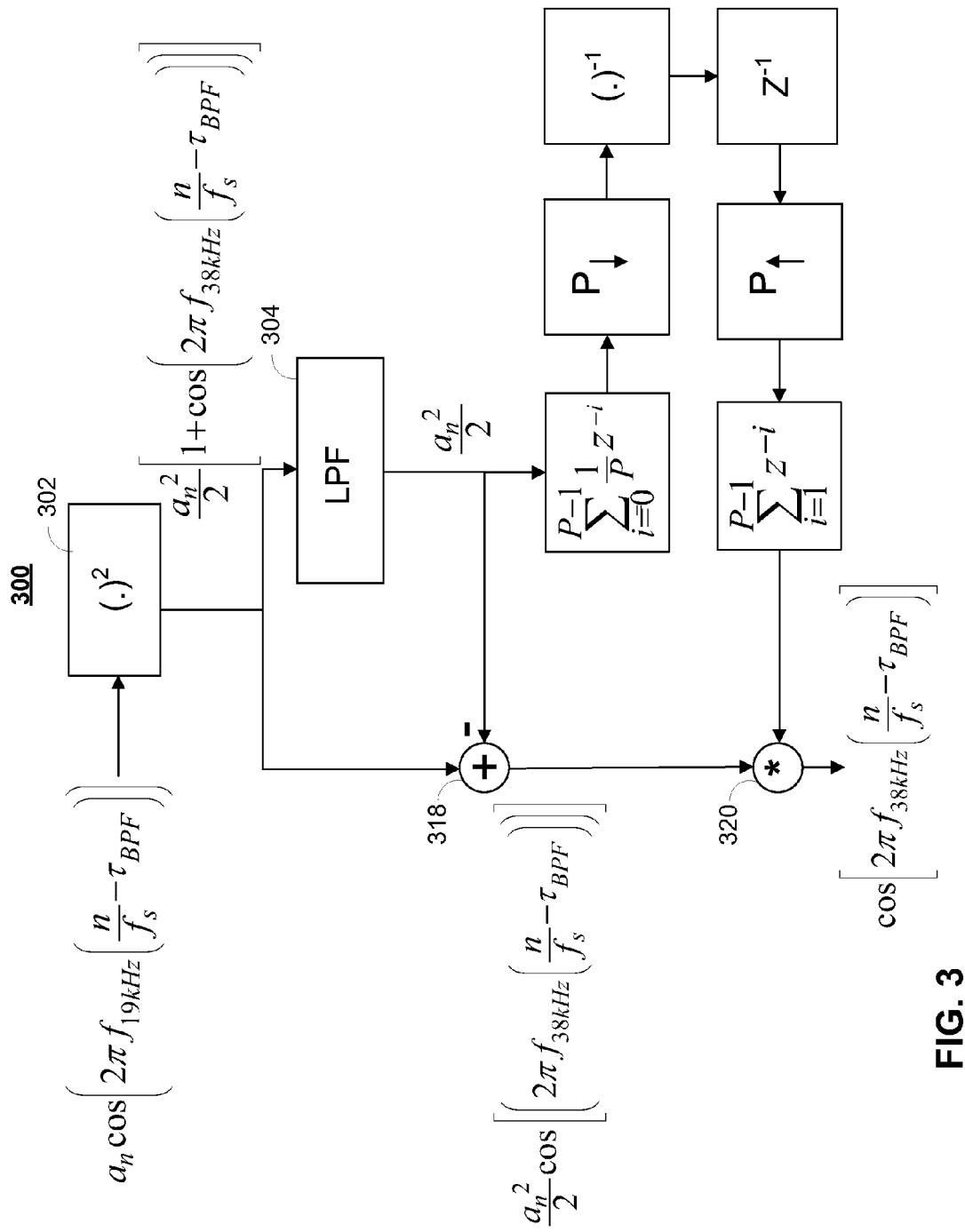
FIG. 3 is an illustrative digital-domain implementation of the FDSN-COS circuitry of FIG. 2.

FIG. 3 provides an exemplary digital-domain implementation 300 of FDSN-COS block 104. In particular, a digital 19 kHz recovered pilot signal $$a_n \cos\left(2\pi f_{19kHz}\left(\frac{n}{f_s} - \tau_{bpf}\right)\right)$$

may be applied as an input to system 300, where n is an integer, $f_s$ is a sampling frequency, and $\tau_{bpf}$ is a digital phase delay introduced by the use of a band-pass filter (not shown) to recover the pilot tone signal from a received MPX signal. This recovered pilot signal then undergoes a square operation 302 to generate a 38 kHz intermediate waveform $$\frac{a_n^2}{2}\left[1+\cos\left(2\pi f_{38kHz}\left(\frac{n}{f_s}-\tau_{bpf}\right)\right)\right].$$

A low-pass filter 304 may be applied to the intermediate signal to extract its amplitude-modulating component $$\frac{a_n^2}{2}.$$

This component may be subtracted from the intermediate signal at adder 318 to produce the signal $$\frac{a_n^2}{2}\cos\left[2\pi f_{38kHz}\left(\frac{n}{f_s}-\tau_{bpf}\right)\right]$$

which is subsequently multiplied with an inverted version of the amplitude-modulating component at multiplier 320 in order to normalize the signal. Hence a normalized 38 kHz sub-carrier signal $$\cos\left[2\pi f_{38kHz}\left(\frac{n}{f_s}-\tau_{bpf}\right)\right]$$

is generated from digital implementation 300 of FDSN-COS block 104.

According to another aspect of the invention, a quadrature phase look-ahead function block, such as block 106 in FIG. 1, may be provided for introducing a phase delay to a 38 kHz sub-carrier signal from FDSN-COS block 104, where the phase delay includes a compensation phase $\phi_1$ and a quadrature phase $$\frac{\pi}{2}.$$

The look-ahead scheme consequently produces a modified 38 kHz sub-carrier signal $$\cos\left(2\pi f_{38kHz}(t-\tau_{bpf})+\phi_1+\frac{\pi}{2}\right).$$

The compensation phase $\phi_1$ of the modified signal should preferably be such that it approximately cancels the non-ideal phase offset $2\pi f_{38kHz}\tau_{bpf}$. Therefore, quadrature look-ahead block 106 may supply the normalized 38 kHz sub-carrier output signal from FDSN-COS block 104 with a desired quadrature phase offset in place of the unknown filter delay $\tau_{bpf}$.

Figure 4:
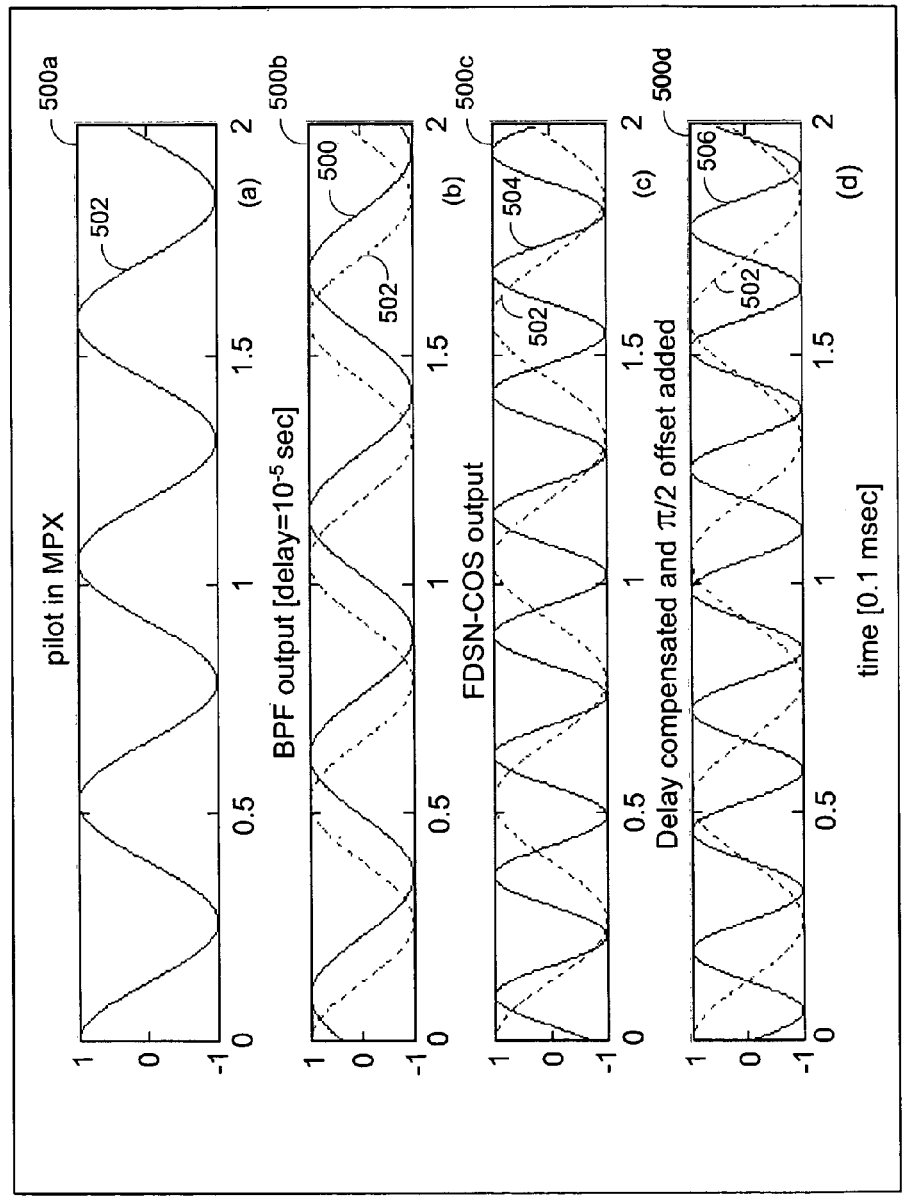
FIG. 4 depicts an illustrate example of a 38 kHz sub-carrier signal recovery using the scheme shown in FIG. 1.

FIG. 4 illustrates the steps of applying the signal recovery scheme described in FIG. 1 to an exemplary MPX signal having an ideal cosine pilot tone signal plot 500a. After the recovered pilot signal is extracted from the MPX signal using a 19 kHz band-pass filter, such as filter 102 in FIG. 1, a non-ideal delay (e.g., a $10^{-5}$ sec delay) is introduced to the recovered pilot signal 500 as shown in plot 500b. In plot 500b it can be observed that the delay also appears in a normalized 38 kHz signal 504 output from FDSN-COS functional block 104. Plot 500d shows a recovered 38 kHz sub-carrier signal 506 after being corrected by quadrature phase look-ahead block 106. The resulting normalized 38 kHz sub-carrier waveform 506 is offset by an approximately quadrature phase from the pilot tone signal 502 while propagating at about twice the pilot frequency.

Figure 5:
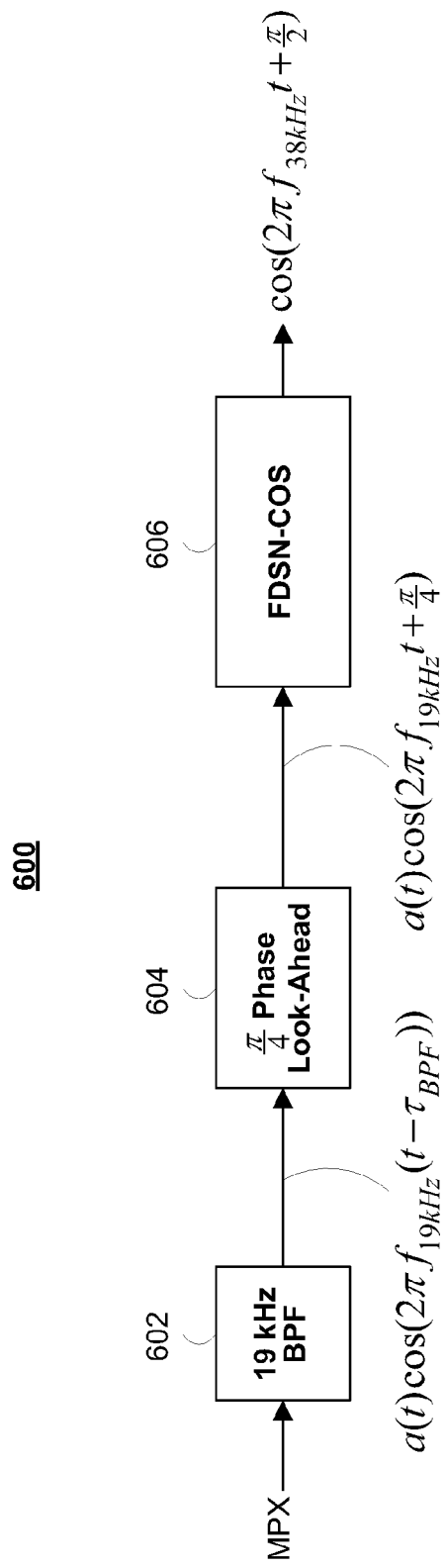
FIG. 5 is an illustrative block diagram of another exemplary 38 kHz sub-carrier signal recovery implementation in accordance with an aspect of the invention.

FIG. 5 depicts another illustrative embodiment of a 38 kHz sub-carrier signal recovery implementation 600 configured for cosine signal processing. According to this embodiment, a recovered pilot signal $a(t)\cos(2\pi f_{19kHz}(t-\tau_{bpf}))$ may be first extracted from an incoming MPX signal using a sharp band-pass filter 602 centered at 19 kHz. This recovered pilot signal may be subsequently passed through a $$\frac{\pi}{4}$$

phase look-ahead functional block 604 which cancels the $\tau_{bpf}$ phase delay in order to introduce an overall $$\frac{\pi}{4}$$

phase delay to the recovered pilot signal, hence generating a phase-shifted recovered pilot signal $$a(t)\cos\left(2\pi f_{19kHz}t+\frac{\pi}{4}\right).$$

This $$\frac{\pi}{4}$$

look-ahead is ultimately used to produce a quadrature phase offset in a 38 KHz sub-carrier output from FDSN-COS block 606. The resulting signal is again a standard sub-carrier waveform $$\cos\left(2\pi f_{38kHz}t+\frac{\pi}{2}\right),$$

where the requisite phase offset may be obtained by squaring phase-shifted recovered pilot signal of $$a(t)\cos\left(2\pi f_{19kHz}t+\frac{\pi}{4}\right)$$

in FDSN-COS block 606. Thus, instead of using a $$\frac{\pi}{2}$$

phase look-ahead block after FDSN-COS block 104 as seen in system 100 of FIG. 1, a $$\frac{\pi}{4}$$

phase look-ahead block may be used before a FDSN-COS block as seen in system 600 of FIG. 5.

According to another aspect of the invention, an exemplary implementation of $$\frac{\pi}{4}$$

phase look-ahead functional block 604 of FIG. 5 may be provided to impose an overall $$\frac{\pi}{4}$$

phase delay in an input pilot signal, where the pilot signal is susceptible to filter noise. This look-ahead scheme operates by introducing a compensation phase $\phi_{2'}$, combined with a $$\frac{\pi}{4}$$

offset, to the recovered pilot signal $a(t)\cos(2\pi f_{19kHz}(t-\tau_{bpf}))$, yielding a phase-shifted pilot signal $$a(t)\cos\left(2\pi f_{19kHz}(t - \tau_{bpf}) + \phi_2 + \frac{\pi}{4}\right).$$

The scheme introduces an overall $$\frac{\pi}{4}$$

delay in the compensated signal by imposing the compensation phase $\phi_2$ to approximately cancel the unwanted phase delay $2\pi f_{19kHz}\tau_{bpf}$. Accordingly, the compensation phase is mathematically expressed as $\phi_2=2\pi f_{19kHz}\tau_{bpf}$. The signal $$a(t)\cos\left(2\pi f_{19kHz} t + \frac{\pi}{4}\right)$$

from phase look-ahead block 604 may subsequently be squared in FDSN-COS block 606 to produce a quadrature phase offset in the resulting waveform.

Figure 6:
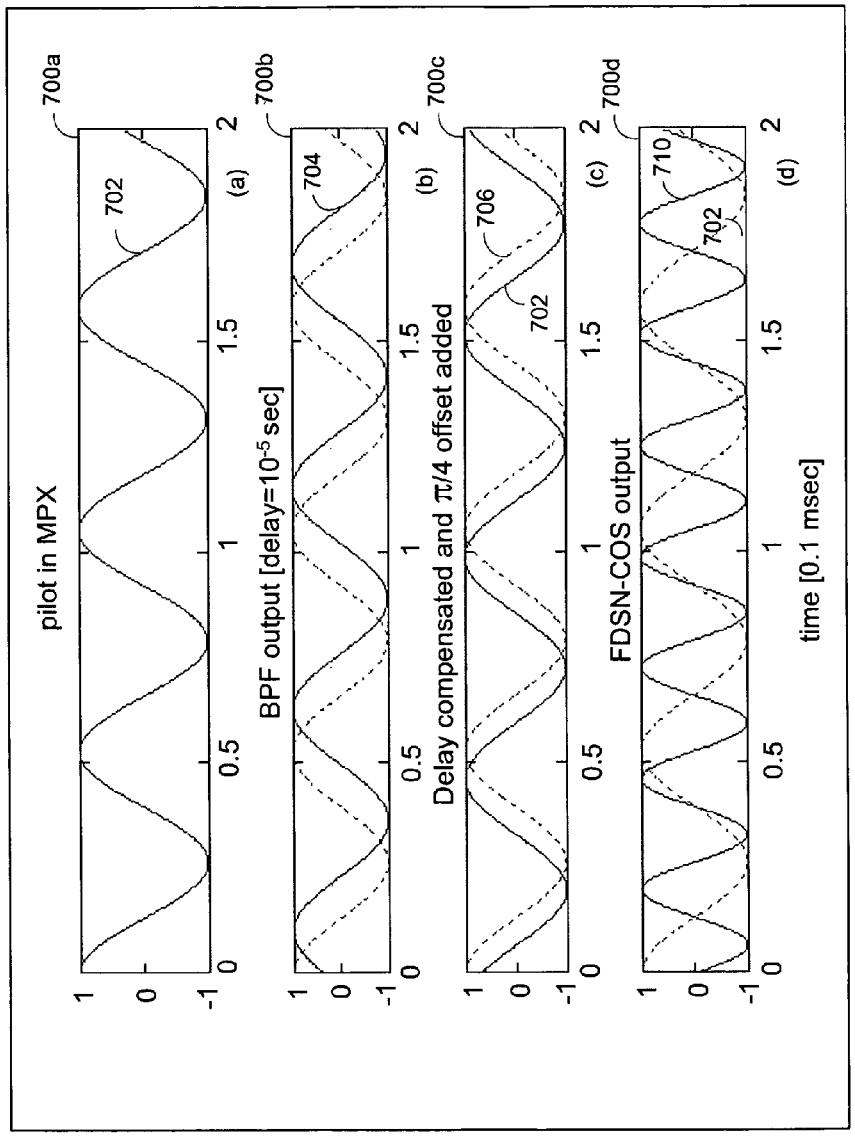
FIG. 6 depicts an illustrate example of a 38 kHz sub-carrier signal recovery using the scheme shown in FIG. 6.

FIG. 6 illustrates the steps of applying the sub-carrier signal recovery scheme described in FIG. 5 to an exemplary MPX signal that includes a cosine pilot tone signal 702 as depicted in plot 700a. A non-ideal delay (e.g., $10^{-5}$ sec delay) may be introduced to a filtered version 704 of the recovered pilot signal as illustrated in plot 700b. Plot 700c shows a recovered pilot signal after being corrected by $$\frac{\pi}{4}$$

phase look-ahead block 604 described above with respect to FIG. 5. The resulting signal is a phase compensated 19 kHz signal 706 with an approximately $$\frac{\pi}{4}$$

phase delay from the ideal pilot tone signal 702. Plot 700d illustrates a recovered 38 kHz sub-carrier signal 710 from the output of FDSN-COS functional block 606. This signal is offset by about a quadrature phase from the ideal pilot tone signal 702 while propagating at twice the pilot tone frequency.

Figure 7:
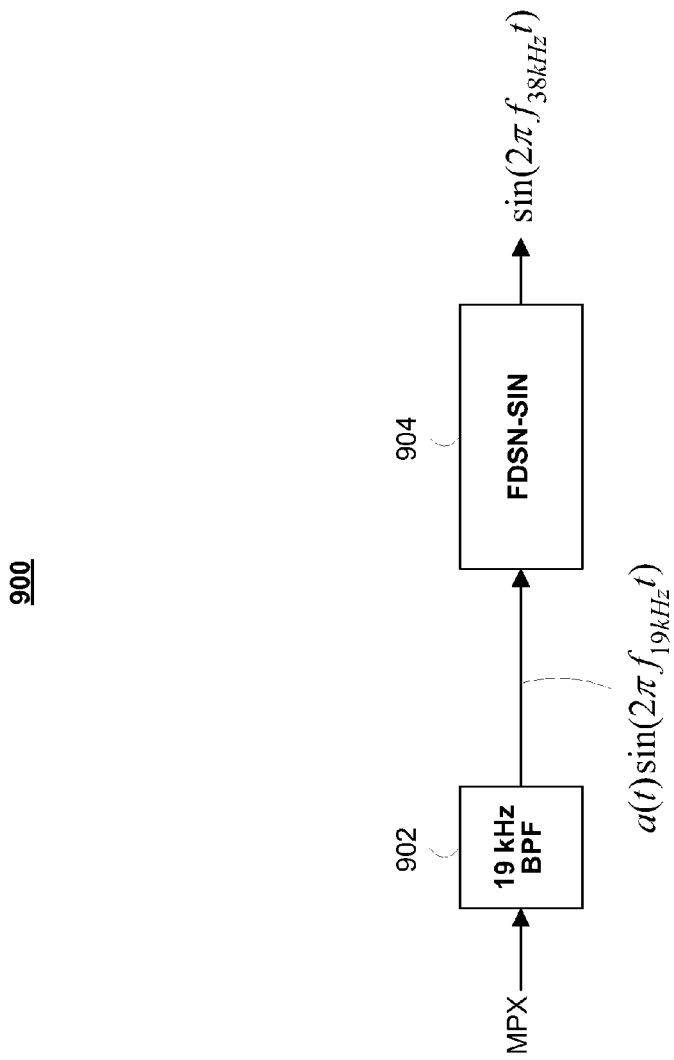
FIG. 7 is an illustrative block diagram of yet another exemplary 38 kHz sub-carrier signal recovery implementation in accordance with an aspect of the invention.

FIG. 7 illustrates yet another illustrative embodiment of a 38 kHz sub-carrier signal recovery implementation 900 configured to process signal that are represented as sine functions. The implementation includes a 19 kHz band-pass filter 902 for recovering a pilot signal from an incoming MPX signal and a Frequency Doubling Scale Normalization (FDSN-SIN) functional block 904 for generating a sine 38 kHz sub-carrier signal in phase with the recovered pilot signal.

In FIG. 7, the received MPX signal may be expressed as a compilation of the following sine functions:

$$MPX = 0.9 * M' + 0.9 * S' * \sin(2\pi f_{38kHz}t) + \\ (0.009 \pm 0.01) * \sin(2\pi f_{19kHz}t),$$

Equation (2)

where the first term corresponds to a baseband summation component signal, the second term corresponds to a 38 kHz-modulated difference component signal, and the third term corresponds to a 19 kHz reference pilot tone signal. Both the summation and difference components may be expressed in terms of L and R signals. In order to maximize a separation between the L and R signals for minimizing channel leakage, the sine sub-carrier signal of the second term in Equation (2) must preferably be in phase with the sine pilot tone signal of the third term in order to satisfy the positive-slope requirement described above. This is in contrast to the cosine representation previously described wherein there is preferably a quadrature phase difference between the 19 kHz pilot tone signal and the 38 kHz sub-carrier signal.

To recover a 38 kHz sub-carrier signal from the scheme depicted in FIG. 7, a sharp band-pass filter centered at 19 kHz may be used to recover a pilot signal $a(t)\sin(2\pi f_{19kHz}t)$ from the MPX signal described in Equation (2), where $a(t)$ is a slow-varying amplitude scaling function.

Figure 8:
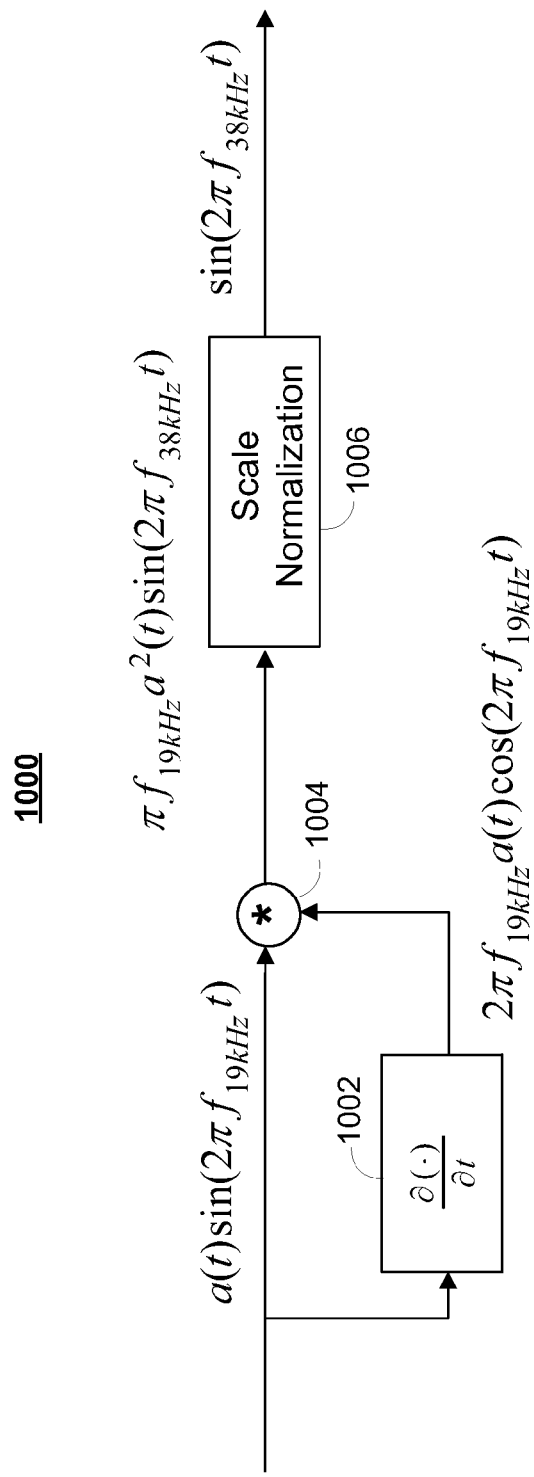
FIG. 8 is an illustrative block diagram of a Frequency-Doubling Sine Signal Normalization (FDSN-SIN) circuitry in accordance with an aspect of the invention.

The sine recovered pilot signal may subsequently be applied to FDSN-SIN functional block 1000 as depicted in detail in FIG. 8. First, an approximated derivative of the recovered pilot signal $2\pi f_{19kHz}a(t)\cos(2\pi f_{19kHz}t)$ may be obtained at differential operation 1002. This estimated derivative signal may then be multiplied with the original pilot signal at multiplier 1004 and based on the trigonometric identity that $\sin 2\theta=2 \sin \theta \cos \theta$ and an intermediate frequency-doubled signal $\pi f_{19kHz}a^2(t)\sin(2\pi f_{38kHz}t)$ is provided. The intermediate signal may then be normalized by a scaling function $$\frac{1}{\pi f_{19kHz}a^2(t)}$$

at scale normalization block 1006 to yield a sub-carrier signal $\sin(2\pi f_{38kHz}t)$.

Figure 9:
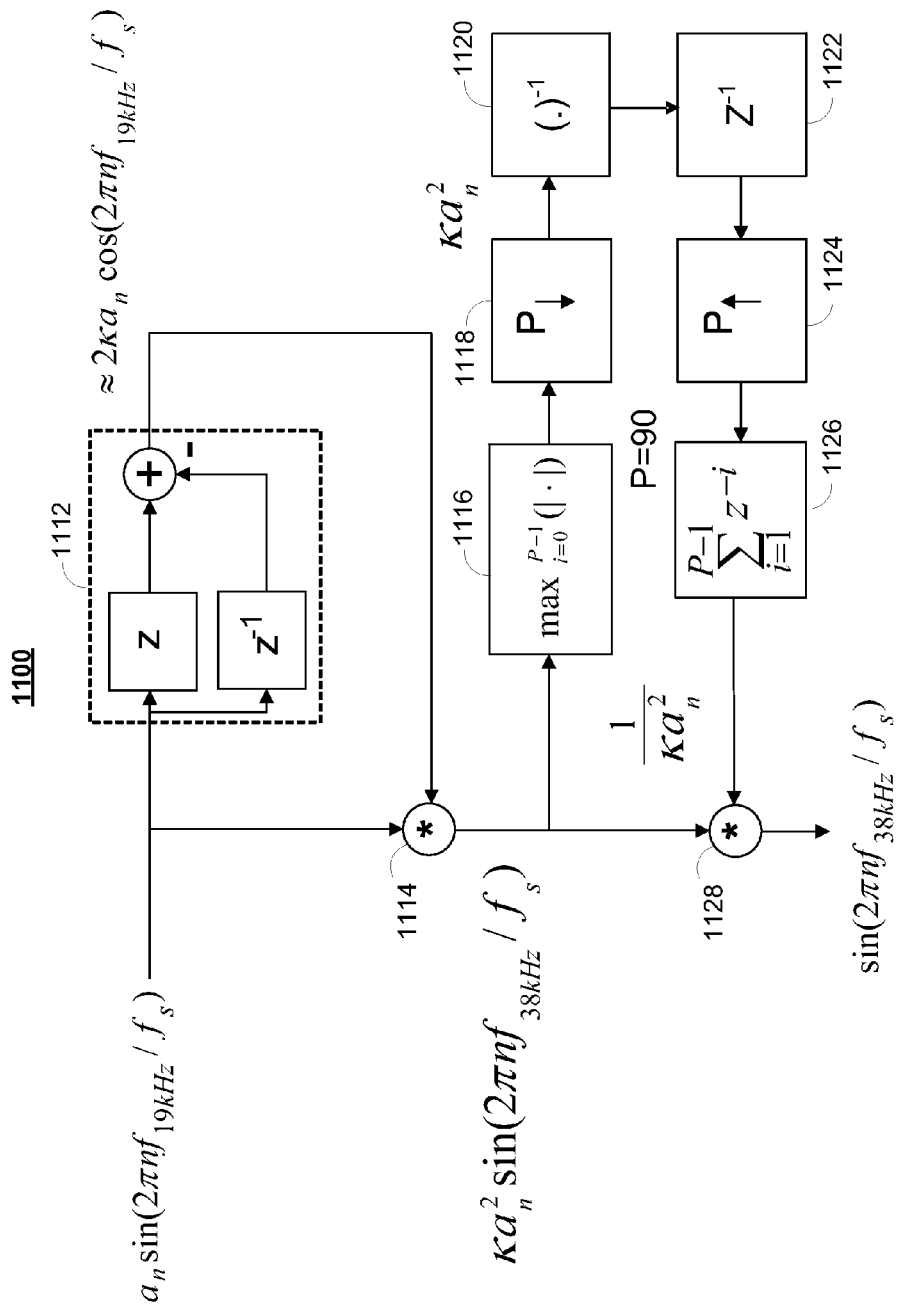
FIG. 9 is an illustrative digital-domain implementation of the FDSN-SIN circuitry of FIG. 9.

FIG. 9 provides an exemplary digital-domain implementation 1100 of FDSN-SIN functional block 1000. In particular, an approximate derivative $$2\kappa a_n \sin\left(2\pi n f_{19kHz} \frac{1}{f_s}\right)$$

of an recovered digital pilot signal $$a_n \sin\left(2\pi n f_{19kHz} \frac{1}{f_s}\right)$$

may be obtained at differential operation 1112. This approximated derivative may then be multiplied with the recovered pilot signal at multiplier 1114 to generate 38 kHz intermediate signal $$\kappa a_n^2 \sin\left(2\pi n f_{38kHz}\frac{1}{f_s}\right)$$

from which its amplitude scaling factor $\kappa a_n^2$ may be extracted at operations 1116-1126. The scaling factor may subsequently be multiplied with the intermediate signal at multiplier 1128 to yield a normalized 38 kHz sub-carrier signal $$\sin\left(2\pi n f_{38kHz}\frac{1}{f_s}\right)$$

in digital domain.

What has been described thus far are systems and methods for recovering a 38 kHz sub-carrier signal from a 19 kHz pilot tone signal and for enforcing a pre-determined phase relation between the two signals to ensure optimized channel separation. In particular, recovery schemes for both cosine and sine signal are provided. In the case of recovering a cosine sub-carrier signal from a recovered cosine pilot signal, two exemplary implementations including respective phase look-ahead schemes are given. The phase look-ahead schemes are tailored to the respective signal recovery implementations such that a desired quadrature phase offset may be maintained in the recovered sub-carrier signal. An exemplary implementation is also given for the recovery of a sine sub-carrier signal from a recovered sine pilot signal.

Figure 10:
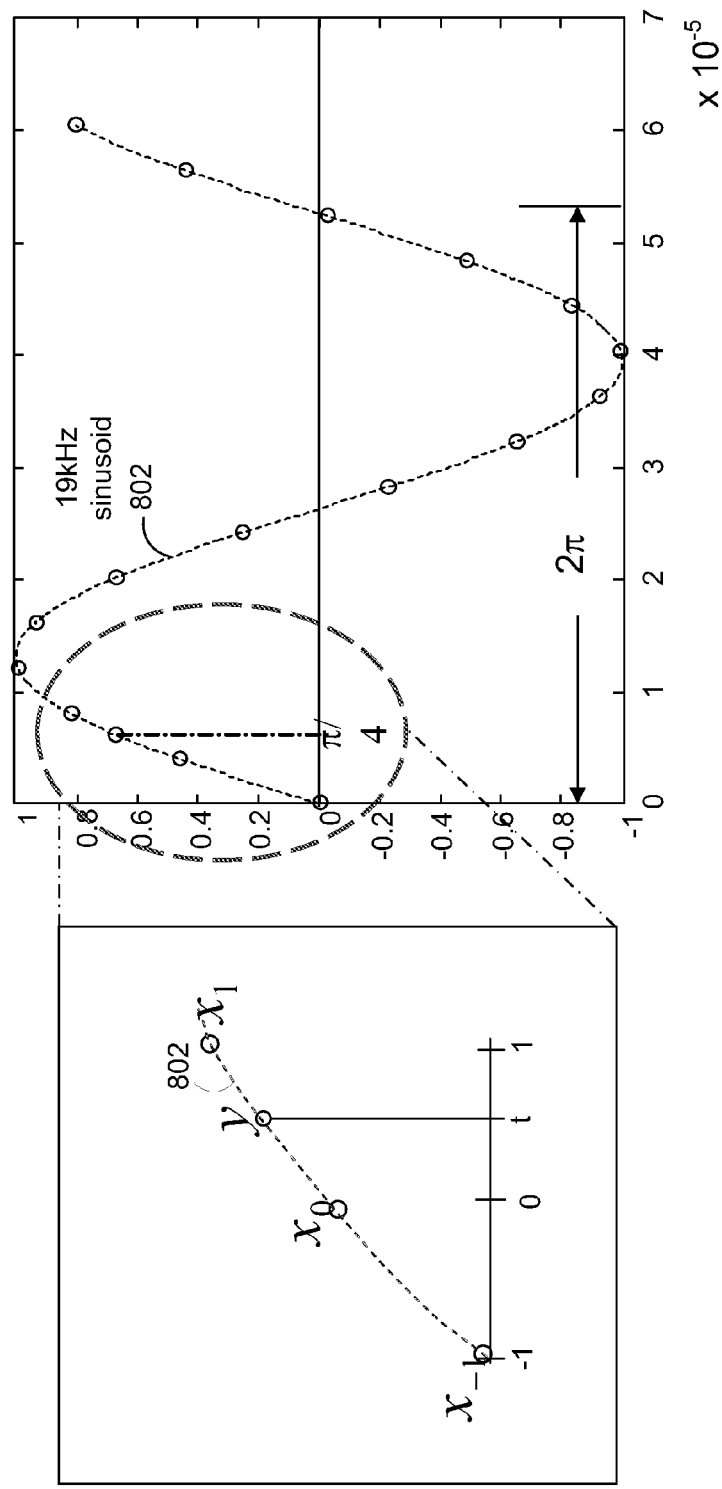
FIG. 10 is an illustrative digital-domain implementation of a phase look-ahead scheme in accordance with an aspect of the invention.

According to yet another aspect of the present invention, an exemplary digital-domain implementation of the phase look-ahead schemes in FIGS. 1 and 5 are provided. In particular, FIG. 10 depicts an illustrative approach to implement a $$\frac{\pi}{4}$$

look-ahead scheme in digital domain. Accordingly, one can approximate a $$\frac{\pi}{4}$$

look-ahead value y at any desired frequency $f_s$ by applying a second order interpolation algorithm to an 19 kHz recovered pilot signal 802, where recovered pilot signal 802 may be delayed by $\tau_{bpf}$. The interpolation may be performed based on three sample points taken along recovered pilot signal 802 in a neighborhood of t, where t is a $$\frac{\pi}{4}$$

look-ahead frequency of $f_s$ that also accounts for the recovered pilot signal filter delay $\tau_{bpf}$. In one embodiment, the value of t may be determined according to the following equation:

$$t = \left[\frac{f_s}{\frac{19\text{ kHz}}{8}} - 1\right] + \tau_{bdf}. \qquad \text{Equation (3)}$$

Once the look-ahead frequency t is determined, the signal value y at t may be estimated using a second-order interpolation based on at least three sample points $x_{-1}$, $x_0$ and $x_1$ taken along recovered pilot signal 802 at pre-defined distances away from t. In one embodiment, Look-ahead value y may be computed using the following interpolation scheme:

$$y = \frac{t(t+1)}{2}x_1 + (1-t^2)x_0 + \frac{t(t-1)}{2}x_{-1}. \qquad \text{Equation (4)}$$

The quadrature look-ahead scheme of FIG. 1 may also be implemented in digital domain using a similar approach as described above based on a quadrature difference instead of a $$\frac{\pi}{4}$$

difference.

It should be understood that any other suitable approximation techniques or variations on the second-order interpolation algorithm may be used in accordance with the present invention. For example, if faster computation is desired, a linear interpolation algorithm may be used to estimate a signal value y based on two sample points in the neighborhood of the look-ahead frequency t. If higher interpolation accuracy is desired, higher order interpolations may be used to estimate a look-ahead value y based on four or more sample points in the neighborhood of t. Moreover, instead of interpolating sample points with linear or polynomial functions, other forms of interpolation may be constructed by choosing different classes of interpolants. In one embodiment, rational interpolation may be used to perform interpolation by rational functions. In another embodiment, trigonometric interpolation may be used to perform interpolation by trigonometric polynomials that may include discrete Fourier transforms. In yet another embodiment, wavelets, or fast decaying oscillating waveforms, may be used to interpolate signals.

The illustrated embodiments of the invention are exemplary and do no limit the scope of the invention. The equations described herein as being implemented by various blocks in the disclosed communication system can be computed by hardware circuits and/or by software instructions running on a processor. The equation computations need not be performed with the exact terms and operations in the equations. For example, the equation computations can be performed using other terms and operations not shown in the equations to approximate the result of computing the equations. Thus, the various blocks in the communication system can perform computations based on the equations without directly computing the equations.

Additionally, the equations are exemplary and do not limit the scope of the invention. MPX signals may be described by equations other then Equations 1 and 2. For example, a MPX signal may include a combination of sine and cosine waveforms. Instead of using the second-order interpolation algorithm described in Equations 3 and 4 to implement the look-ahead schemes of the present invention, other suitable estimation methods may be used as described above. Further, while typical MPX cosine and sub-cosine frequencies are used, it should be understood that any other suitable frequencies may also be used in accordance with the invention.

Referring now to FIGS. 11A-11E, various exemplary implementations of the present invention are shown.

Figure 11A:
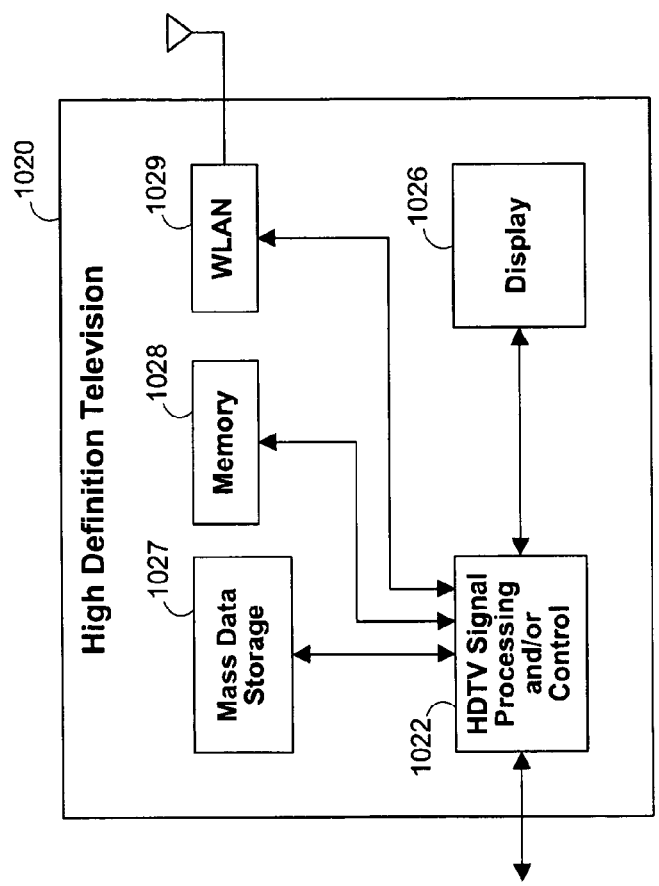
FIG. 11A is a block diagram of an exemplary high definition television that can employ the disclosed technology.

Referring now to FIG. 11A, the present invention can be implemented in a high definition television (HDTV) 1020. The present invention may implement either or both signal processing and/or control circuits, which are generally identified in FIG. 11A at 1022, a WLAN interface and/or mass data storage of the HDTV 1020. The HDTV 1020 receives HDTV input signals in either a wired or wireless format and generates HDTV output signals for a display 1026. In some implementations, signal processing circuit and/or control circuit 1022 and/or other circuits (not shown) of the HDTV 1020 may process data, perform coding and/or encryption, perform calculations, format data and/or perform any other type of HDTV processing that may be required.

The HDTV 1020 may communicate with mass data storage 1027 that stores data in a nonvolatile manner such as optical and/or magnetic storage devices. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN network interface 1029.

Figure 11B:
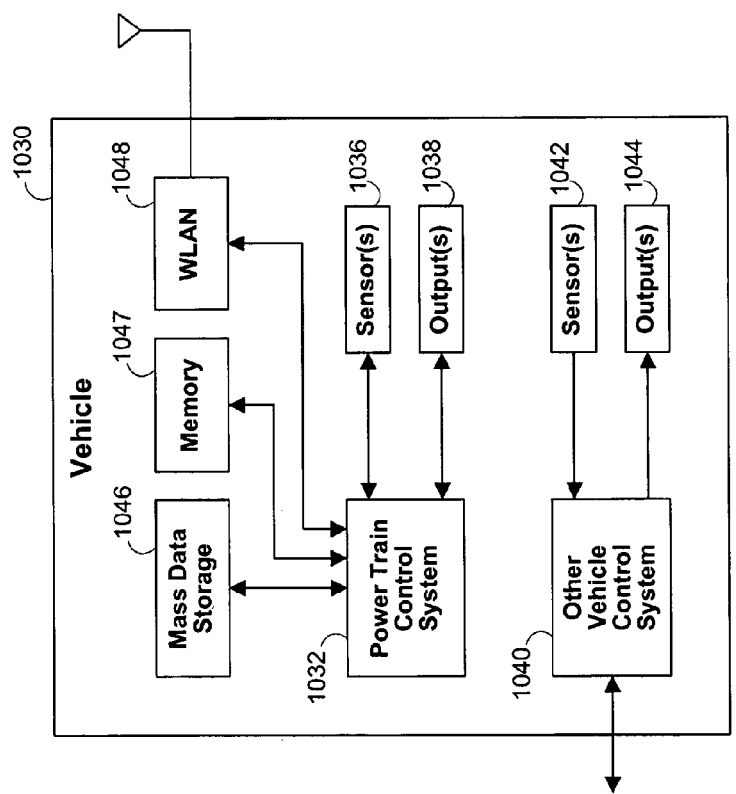
FIG. 11B is a block diagram of an exemplary vehicle that can employ the disclosed technology.

Referring now to FIG. 11B, the present invention implements a control system of a vehicle 1030, a WLAN interface and/or mass data storage of the vehicle control system. In some implementations, the present invention may implement a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1040 of the vehicle 1030. The control system 1040 may likewise receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives HDD and/or DVDs. The HDD may be a mini HDD that includes one or more platters having a diameter that is smaller than approximately 1.8". The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN network interface 1048. The control system 1040 may also include mass data storage, memory and/or a WLAN interface (all not shown).

Figure 11C:
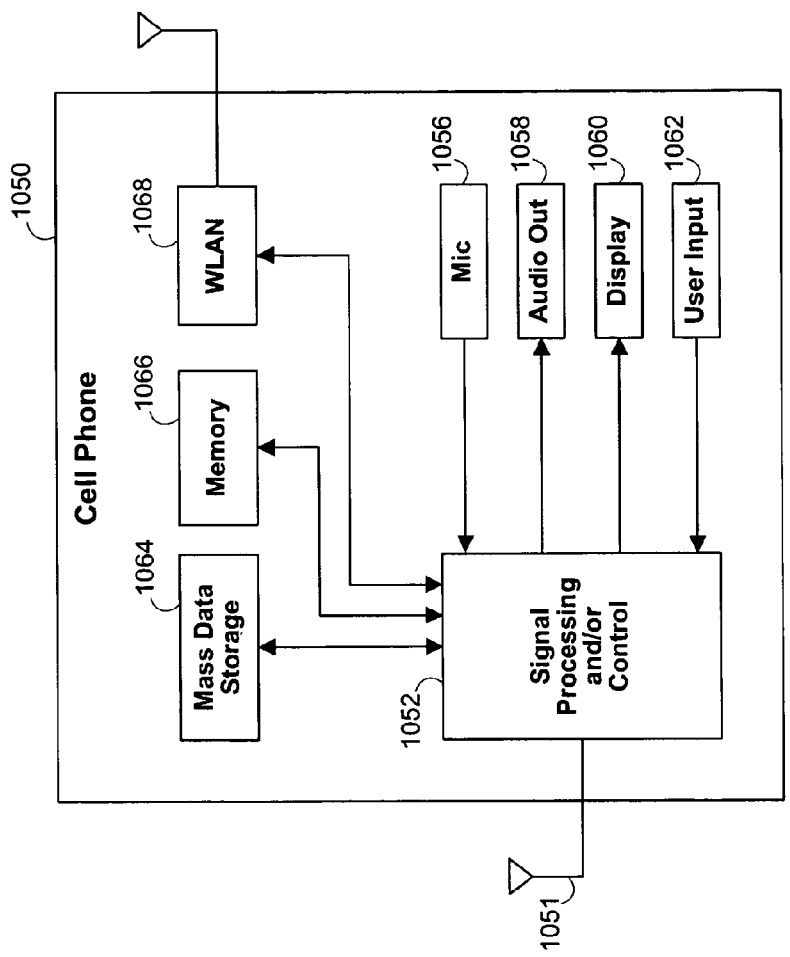
FIG. 11C is a block diagram of an exemplary cell phone that can employ the disclosed technology.

Referring now to FIG. 11C, the present invention can be implemented in a cellular phone 1050 that may include a cellular antenna 1051. The present invention may implement either or both signal processing and/or control circuits, which are generally identified in FIG. 11C at 1052, a WLAN interface and/or mass data storage of the cellular phone 1050. In some implementations, the cellular phone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular phone 1050 may process data, perform coding and/or encryption, perform calculations, format data and/or perform other cellular phone functions.

The cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1050 may be connected to memory 1066 such as RAM, ROM, low latency nonvolatile memory such as flash memory and/or other suitable electronic data storage. The cellular phone 1050 also may support connections with a WLAN via a WLAN network interface 1068.

Figure 11D:
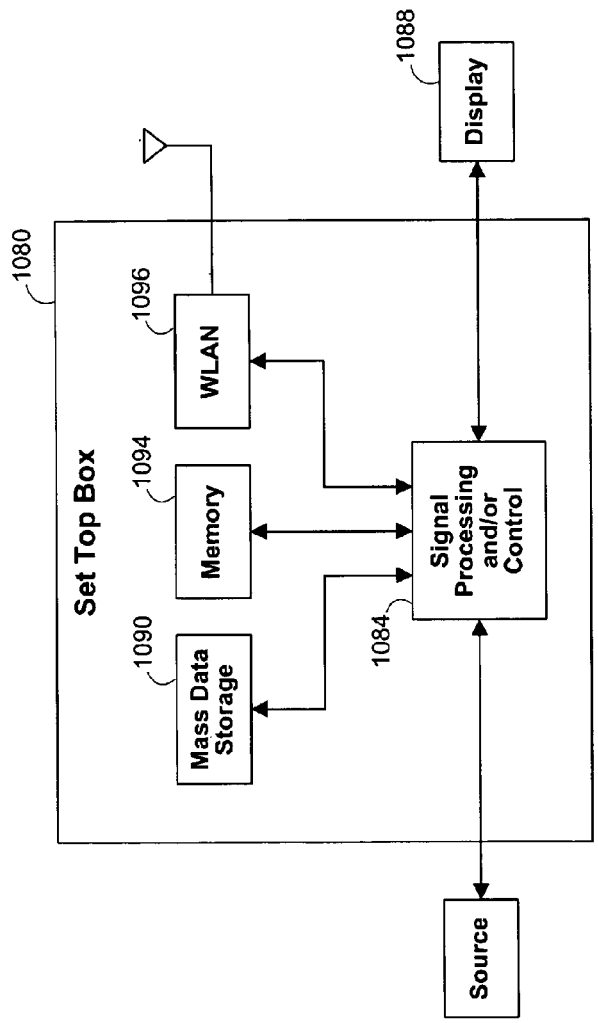
FIG. 11D is a block diagram of an exemplary set top box that can employ the disclosed technology.

Referring now to FIG. 11D, the present invention can be implemented in a set top box 1080. The present invention may implement either or both signal processing and/or control circuits, which are generally identified in FIG. 11D at 1084, a WLAN interface and/or mass data storage of the set top box 1080. The set top box 1080 receives signals from a source such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives HDD and/or DVDs. The HDD may be a mini HDD that includes one or more platters having a diameter that is smaller than approximately 1.8". The set top box 1080 may be connected to memory 1094 such as RAM, ROM, low latency nonvolatile memory such as flash memory and/or other suitable electronic data storage. The set top box 1080 also may support connections with a WLAN via a WLAN network interface 1096.

Figure 11E:
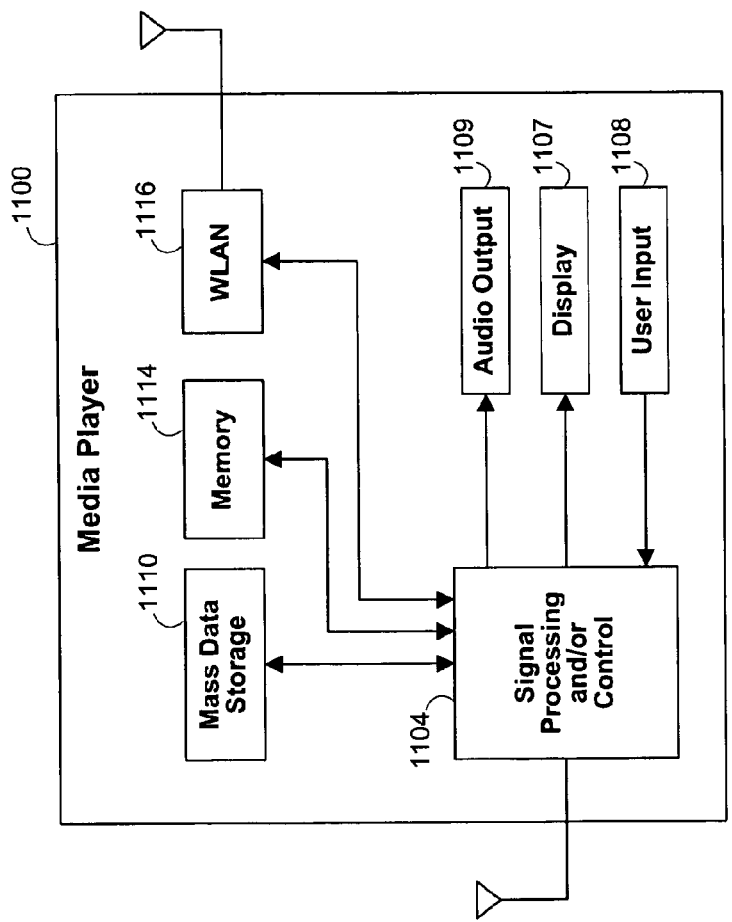
FIG. 11E is a block diagram of an exemplary media player that can employ the disclosed technology.

Referring now to FIG. 11E, the present invention can be implemented in a media player 1100. The present invention may implement either or both signal processing and/or control circuits, which are generally identified in FIG. 11E at 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN network interface 1116. Still other implementations in addition to those described above are contemplated.

Thus it is seen that systems and methods are provided for efficient and accurate recovery of a 38 kHz sub-carrier signal in an analog FM receiver. One skilled in the art will appreciate that the invention can be practiced by other than the described embodiments, which are presented for purposes of illustration and not of limitation, and the present invention is limited only by the claims which follow.

What is claimed is:

1. A method comprising:
  recovering, with receiver circuitry, a pilot signal from a received multiplexed signal, wherein the recovered pilot signal includes a first phase offset from a pilot tone signal embedded in the received multiplexed signal;
  generating a frequency-scaled signal from the recovered pilot signal; and
  determining a second phase offset based on the first phase offset and a pre-determined phase offset;
  phase-shifting the frequency-scaled signal by the second phase offset; and
  recovering a sub-carrier signal from the multiplexed signal based on the recovered pilot signal and the phase-shifted frequency-scaled signal.

2. The method of claim 1, wherein the recovered pilot signal, the frequency-scaled signal, and the recovered sub-carrier signal are digital signals.

3. The method of claim 1, wherein generating the frequency-scaled signal from the recovered pilot signal comprises:
  squaring the recovered pilot signal to generate an intermediate signal;
  subtracting an amplitude scaling function from the intermediate signal; and
  multiplying the intermediate signal with an inverse of the amplitude scaling function to generate the frequency-scaled signal.

4. The method of claim 3, wherein the amplitude scaling function is generated based on extracting a low-frequency component of the intermediate function to generate an amplitude scaling function.

5. The method of claim 1, wherein generating the frequency-scaled signal from the recovered pilot signal comprises:
  multiplying the recovered pilot signal with an estimated derivative of the recovered pilot signal to generate an intermediate signal; and
  multiplying the intermediate signal with an amplitude scaling function to generate the frequency-scaled signal.

6. The method of claim 5, wherein the recovered pilot signal is a digital signal, and wherein the estimated derivative of the recovered pilot signal is generated based on a difference operation.

7. The method of claim 1, wherein the pre-determined phase offset is approximately a quadrature phase offset.

8. The method of claim 1, wherein the pre-determined phase offset is approximately a zero phase offset.

9. The method of claim 1, wherein the frequency-scaled signal is a frequency-doubled signal.

10. A system comprising receiver circuitry configured to:
  recover a pilot signal from a received multiplexed signal, wherein the recovered pilot signal includes a first phase offset from a pilot tone signal embedded in the received multiplexed signal;
  generate a frequency-scaled signal from the recovered pilot signal;
  determine a second phase offset based on the first phase offset and a pre-determined phase offset;
  phase-shift the frequency-scaled signal by the second phase offset; and
  recover a sub-carrier signal from the multiplexed signal based on the recovered pilot signal and the phase-shifted frequency-scaled signal.

11. The system of claim 10, wherein the recovered pilot signal, the frequency-scaled signal, and the recovered sub-carrier signal are digital signals.

12. The system of claim 10, wherein the receiver circuitry is further configured to:
  square the recovered pilot signal to generate an intermediate signal;
  subtract an amplitude scaling function from the intermediate signal; and
  multiply the intermediate signal with an inverse of the amplitude scaling function to generate the frequency-scaled signal.

13. The system of claim 12, wherein the amplitude scaling function is generated based on extracting a low-frequency component of the intermediate function to generate an amplitude scaling function.

14. The system of claim 10, wherein the receiver circuitry is further configured to:
  multiply the recovered pilot signal with an estimated derivative of the recovered pilot signal to generate an intermediate signal; and
  multiply the intermediate signal with an amplitude scaling function to generate the frequency-scaled signal.

15. The system of claim 10, wherein the pre-determined phase offset is approximately a quadrature phase offset.

16. A system comprising receiver circuitry configured to:
  recover a pilot signal from a received multiplexed signal, wherein the recovered pilot signal includes a first phase offset from a pilot tone signal embedded in the received multiplexed signal;
  determine a second phase offset based on the first phase offset and a pre-determined phase offset;
  phase-shift the pilot signal by the second phase offset;
  generate a frequency-scaled signal from the phase-shifted pilot signal; and
  recover a sub-carrier signal from the multiplexed signal based on the recovered pilot signal and the frequency-scaled signal.

17. The system of claim 16, wherein the recovered pilot signal, the frequency-scaled signal, and the recovered sub-carrier signal are digital signals.

18. The system claim 16, the receiver circuitry is further configured to:
  square the phase-shifted pilot signal to generate an intermediate signal;
  subtract an amplitude scaling function from the intermediate signal; and
  multiply the intermediate signal with an inverse of the amplitude scaling function to generate the frequency-scaled signal.

19. The system of claim 16, wherein the receiver circuitry is further configured to:
  multiply the phase-shifted pilot signal with an estimated derivative of the phase-shifted pilot signal to generate an intermediate signal; and
  multiply the intermediate signal with an amplitude scaling function to generate the frequency-scaled signal.

20. The system of claim 16, wherein the pre-determined phase offset is approximately a quadrature phase offset.

* * * * *